(12) United States Patent
Ben Henda

(10) Patent No.: US 11,849,325 B2
(45) Date of Patent: Dec. 19, 2023

(54) SECURITY MECHANISM FOR INTERWORKING WITH INDEPENDENT SEAF IN 5G NETWORKS

(71) Applicant: Telefonaktiebolaget LM Ericsson (publ), Stockholm (SE)

(72) Inventor: Noamen Ben Henda, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 634 days.

(21) Appl. No.: 16/957,598

(22) PCT Filed: Jan. 3, 2019

(86) PCT No.: PCT/EP2019/050109
§ 371 (c)(1),
(2) Date: Jun. 24, 2020

(87) PCT Pub. No.: WO2019/141520
PCT Pub. Date: Jul. 25, 2019

(65) Prior Publication Data
US 2021/0058793 A1    Feb. 25, 2021

Related U.S. Application Data

(60) Provisional application No. 62/618,542, filed on Jan. 17, 2018.

(51) Int. Cl.
*H04W 12/122* (2021.01)
*H04W 12/0431* (2021.01)
(Continued)

(52) U.S. Cl.
CPC .......... *H04W 12/122* (2021.01); *H04W 8/08* (2013.01); *H04W 12/041* (2021.01); *H04W 12/0431* (2021.01); *H04W 48/16* (2013.01)

(58) Field of Classification Search
CPC .......... H04W 12/122; H04W 12/0431; H04W 12/041; H04W 8/08; H04W 48/16
See application file for complete search history.

(56) References Cited

U.S. PATENT DOCUMENTS 9,276,909 B2   3/2016   Barany et al.
9,843,921 B2   12/2017  Mildh et al.
(Continued)

FOREIGN PATENT DOCUMENTS

| KR | 20100086497 A | 7/2010 |
| KR | 20110061589 A | 6/2011 |
| KR | 20180004612 A | 1/2018 |

OTHER PUBLICATIONS

Nokia et al, "Preventing Bidding Down Between 5G Releases—Discussion", Nov. 27, 2017, 3GPP (Year: 2017).*
(Continued)

*Primary Examiner* — Ashokkumar B Patel
*Assistant Examiner* — Forrest L Carey
(74) *Attorney, Agent, or Firm* — COATS & BENNETT, PLLC

(57) ABSTRACT

Methods and network equipment for implementing security mechanism for interworking with independent security anchor function (SEAF) in 5G networks. A method performed by the standalone SEAF comprises receive a first request for a key to secure communication between the UE and a first access and mobility function (AMF) which a user equipment (UE) requests registration, wherein the request includes a first indication that indicates UE supports a standalone SEAF or not; receive, from a second AMF with which the UE requests registration for performing inter-AMF mobility to the second AMF, a second request for a key to secure communication between the UE and the second AMF, wherein the request includes a second indication that indicates the UE supports a standalone SEAF or not; and (Continued)

determine whether or not a bidding down attack has occurred depending at least in part on whether the first indication matches the second indication.

14 Claims, 10 Drawing Sheets

(51) Int. Cl.
    *H04W 12/041*    (2021.01)
    *H04W 8/08*    (2009.01)
    *H04W 48/16*    (2009.01)

(56) References Cited

U.S. PATENT DOCUMENTS

2010/0130168 A1* 5/2010 Mizikovsky .......... H04L 63/205 455/410
2018/0007552 A1 1/2018 Bae et al.
2019/0208573 A1* 7/2019 Yang ................... H04L 65/1069

OTHER PUBLICATIONS

Nokia, "Evolution Scenario for AMF and SEAF From 5G Phase 1 to Later Phases", Mar. 27, 2017, 3GPP (Year: 2017).*

3GPP, "TS 33.501: 3rd Generation Partnership Project; Technical Specification Group Services and System Aspects; Security Architecture and Procedures for 5G System", Dec. 1, 2017, 3GPP (Year: 2017).*

Nokia, Preventing bidding down between 5G releases—discussion, 3GPP TSG SA WG3 (Security) Meeting #88-Bis, Oct. 9-13, 2017, Singapore, S3-172401, revision of S3-17xabc.

Huawei, Hisilicon, A solution for KDF negotiation, 3GPP TSG SA WG3 (Security) Meeting #86, Feb. 6-10, 2017, Sophia Antipolis (France), S3-170125, revision of S3-17xabc.

Ericsson, Nokia Siemens Networks, Removal of UE Security Capabilities IE from Handover Notify message, 3GPP TSG RAN WG3 Meeting #63, Athens, Greece, Feb. 9-13, 2009, R3-090217.

Nokia et al., "Preventing Bidding Down Between 5G Releases—pCR", 3GPP TSG SA WG3 (Security) Meeting #90, Gothenburg, Sweden, Jan. 22, 2018, pp. 1-4, S3-180087, 3GPP.

Nokia, et al., "Preventing Bidding Down Between 5G Releases—Discussion", 3GPP TSG SA WG3 (Security) Meeting #89, Reno, USA, Nov. 27, 2017, pp. 1-2, S3-173127, 3GPP.

Nokia, "Evolution Scenario for AMF and SEAF From 5G Phase 1 to Later Phases", 3GPP TSG SA WG3 (Security) Meeting #86bis, Busan, Korea, Mar. 27, 2017, pp. 1-3, S3-170636, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.0.0, Dec. 1, 2017, pp. 1-181, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V15.0.0, Dec. 1, 2017, pp. 1-258, 3GPP.

3rd Generation Partnership Project, "3rd Generation Partnership Project; Technical Specification Group Services and System Aspects; Policy and Charging Control Framework for the 5G System; Stage 2 (Release 15)", Technical Specification, 3GPP TS 23.503 V15.0.0, Dec. 1, 2017, pp. 1-56, 3GPP.

3rd Generation Partnership Project, "3rd Generation Partnership Project; Technical Specification Group Services and System Aspects; Security Architecture and Procedures for 5G System (Release 15)", Technical Specification, 3GPP TS 33.501 V0.6.0, Dec. 1, 2017, pp. 1-79, 3GPP.

3rd Generation Partnership Project, "3rd Generation Partnership Project; Technical Specification Group Services and System Aspects; 3GPP System Architecture Evolution (SAE); Security Architecture (Release 15)", Technical Specification, 3GPP TS 33.401 V15.1.0, Sep. 1, 2017, pp. 1-161, 3GPP.

Nokia et al., "Preventing Bidding Down Between 5G releases—pCR", 3GPP TSG SA WG3 (Security) Meeting #89, Reno, US, Nov. 27, 2017, pp. 1-4, S3-173128, 3GPP.

* cited by examiner

SECURITY MECHANISM FOR INTERWORKING WITH INDEPENDENT SEAF IN 5G NETWORKS

TECHNICAL FIELD

The present disclosure relates to methods and network equipment to implement a standalone security anchor function (SEAF) and an access and mobility function (AMF) in a wireless communication network.

BACKGROUND

The 3rd Generation Partnership Project (3GPP) is currently working on the standardization of 5G. Due to the overwhelming number of new features and requirements to be supported by 5G networks, the standardization process has been split into two phases. Phase 1 is described in the Release 15 of the 3GPP Technical Specification (TS). Phase 2 has started but has not been finalized yet. TS 23.501, TS 23.502 and TS 23.503 are architecture specifications and the architecture of the 5G system is showed in FIG. 1. TS 33.501 is the specification for security of 5G.

The security architecture in phase 1 is similar to that of 4G systems as described in TS 33.401. In the 5G Core Network (CN), the Access and Mobility Management Function (AMF) is the counterpart of the Mobility Management Entity (MME) node in the Evolved Packet Core (EPC). The AMF is the termination for the NAS protocol with the UE. Security is primarily established between the AMF and the UE to secure the Non Access Stratum (NAS) connection and also to derive further keys to secure the communication between the User Equipment (UE) and the Radio Access Network (RAN) node or Access Network (AN) node.

Challenges exist in securing the wireless communication system, especially in a way where Phase 1 sufficiently prepares for any security features that Phase 2 may add, while maintaining backwards compatibility.

SUMMARY

Some embodiments herein include network equipment configured to implement a security anchor function (SEAF) in a wireless communication system. The network equipment may be configured to receive, from a first access and mobility function (AMF) with which a user equipment (UE) requests registration, a first request for a key to secure communication between the UE and the first AMF, wherein the request includes a first indication that indicates whether or not the UE supports a standalone SEAF. The network equipment may further be configured to receive, from a second AMF with which the UE requests registration for performing inter-AMF mobility to the second AMF, a second request for a key to secure communication between the UE and the second AMF, wherein the request includes a second indication that indicates whether or not the UE supports a standalone SEAF. The network equipment may also be configured to determine whether or not a bidding down attack has occurred depending at least in part on whether the first indication matches the second indication.

More particularly, embodiments herein include a network equipment configured to implement a SEAF in a wireless communication system. The network equipment comprises processing circuitry and memory, the memory containing instructions executable by the processing circuitry wherein the network equipment is configured to receive, from a first AMF with which a UE requests registration, a first request for a key to secure communication between the UE and the first AMF, wherein the request includes a first indication that indicates whether or not the UE supports a standalone SEAF. The network equipment may further be configured to receive, from a second AMF with which the UE requests registration for performing inter-AMF mobility to the second AMF, a second request for a key to secure communication between the UE and the second AMF, wherein the request includes a second indication that indicates whether or not the UE supports a standalone SEAF. The network equipment may also be configured to determine whether or not a bidding down attack has occurred depending at least in part on whether the first indication matches the second indication.

In some embodiments, for example, the network equipment is configured to, in response to the first request, return the requested key. The network equipment may be configured to store or discard the key returned in response to the first request, depending respectively on whether or not the first indication indicates the UE supports a standalone SEAF. In this case, then, the network equipment may be configured to determine whether or not a bidding down attack has occurred depending on whether or not a key is stored for the UE and whether or not the second indication indicates that the UE supports a standalone SEAF.

More particularly, embodiments herein include a method performed by network equipment configured to implement a standalone SEAF in a wireless communication network, the method comprises receive, from a first AMF with which a UE requests registration, a first request for a key to secure communication between the UE and the first AMF, wherein the request includes a first indication that indicates whether or not the UE supports a standalone SEAF. The method may further comprise receive, from a second AMF with which the UE requests registration for performing inter-AMF mobility to the second AMF, a second request for a key to secure communication between the UE and the second AMF, wherein the request includes a second indication that indicates whether or not the UE supports a standalone SEAF. The method may further comprise determine whether or not a bidding down attack has occurred depending at least in part on whether the first indication matches the second indication.

In some embodiments, for example, the method may further comprise, in response to the first request, return the requested key. The method may further comprise store or discard the key returned in response to the first request, depending respectively on whether or not the first indication indicates the UE supports a standalone SEAF. In this case, then, the method may further comprise determine whether or not a bidding down attack has occurred depending on whether or not a key is stored for the UE and whether or not the second indication indicates that the UE supports a standalone SEAF.

Other embodiments herein also include a network equipment configured to implement an AMF in a wireless communication network. The network equipment may be configured to receive from a UE a request for registration with the AMF. The network equipment may be further configured to responsive to receiving the request from the UE, transmit to a standalone SEAF a request for a key to secure communication between the UE and the AMF, wherein the request includes an indication that indicates whether or not the UE supports a standalone SEAF.

Other embodiments herein include a method performed by network equipment configured to implement an AMF in a wireless communication network. The method comprises receive from a UE a request for registration with the AMF. The method may further comprise, responsive to receiving the request from the UE, transmit to a standalone SEAF a request for a key to secure communication between the UE and the AMF, wherein the request includes an indication that indicates whether or not the UE supports a standalone SEAF.

Other embodiments herein include network equipment configured to implement an AMF in a wireless communication system. The network equipment comprises processing circuitry and memory, the memory containing instructions executable by the processing circuitry wherein the network equipment is configured to receive from a UE a request for registration with the AMF. The network equipment may be further configured to responsive to receiving the request from the UE, transmit to a standalone SEAF a request for a key to secure communication between the UE and the AMF, wherein the request includes an indication that indicates whether or not the UE supports a standalone SEAF.

Other embodiments herein include a method performed by network equipment configured to implement an AMF in a wireless communication network. The method comprises receive from a UE a request for registration with the AMF. The method may further comprise, responsive to receiving the request from the UE, transmit to a standalone SEAF a request for a key to secure communication between the UE and the AMF, wherein the request includes an indication that indicates whether or not the UE supports a standalone SEAF.

Other embodiments herein also include a computer program. The computer program comprises instructions which, when executed by at least one processor of network equipment, causes the network equipment device to perform the methods above.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Alternatively or additionally, some embodiments make use of an additional indication in the UE security capability indicating the support of an independent SEAF. When the UE is first authenticated in a Phase 2 AMF supporting an interface to a decoupled SEAF entity, then based on the indication provided, the SEAF will keep a security key for the UE in case the indication is positive otherwise it will dispose of it. Some embodiments do not require any features to be specified in advance already in Phase 1 in order to prepare for future CN deployment with decoupled SEAF.

Some advantages of some embodiments include:
1. It provides protection against bidding down attacks by leveraging the legacy mechanism based on the NAS Security Mode Command (SMC) procedure
2. It does not require any features already in phase 1 to prepare for potential future CN deployment with independent SEAFs; and/or
3. It allows coexistence of phase 1 and phase 2 UEs and AMFs

BRIEF DESCRIPTION OF THE DRAWINGS

The inventive concept is now described, by way of example, with reference to the accompanying drawings, in which.

DETAILED DESCRIPTION

Figure 1:
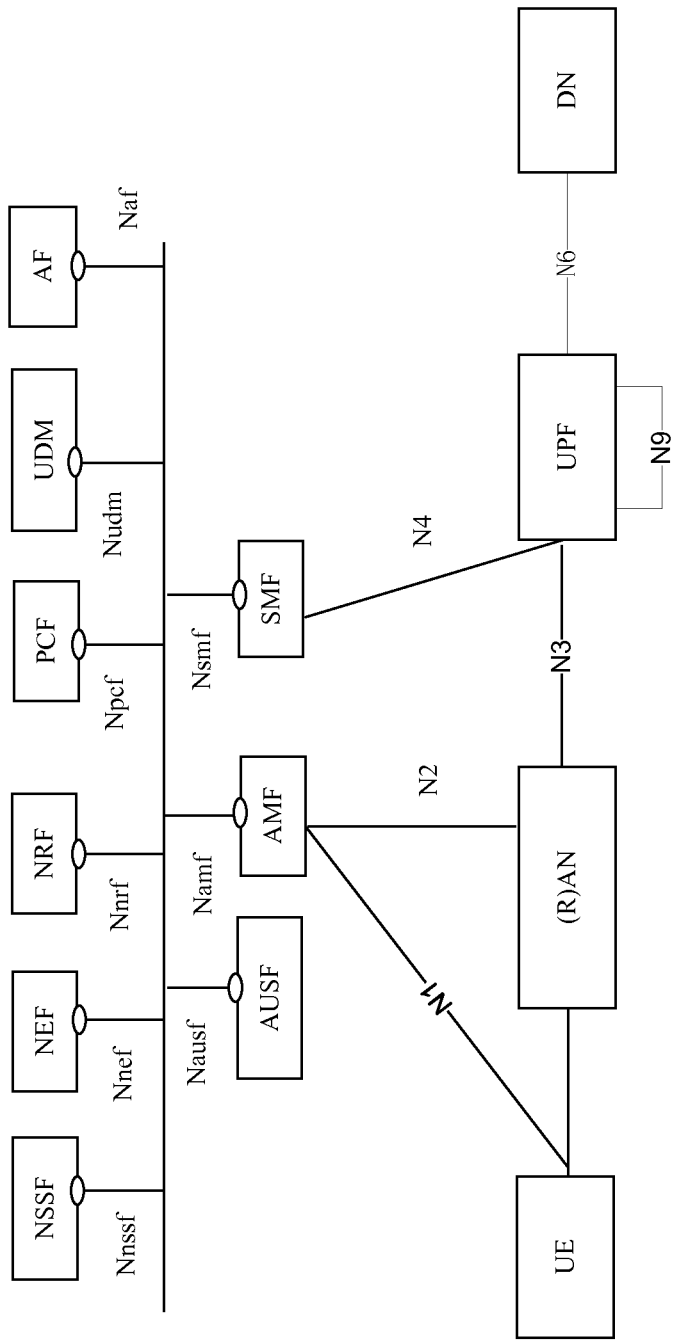
FIG. 1 is an architecture of 5G system illustrated in TS 23.501.
Figure 2:
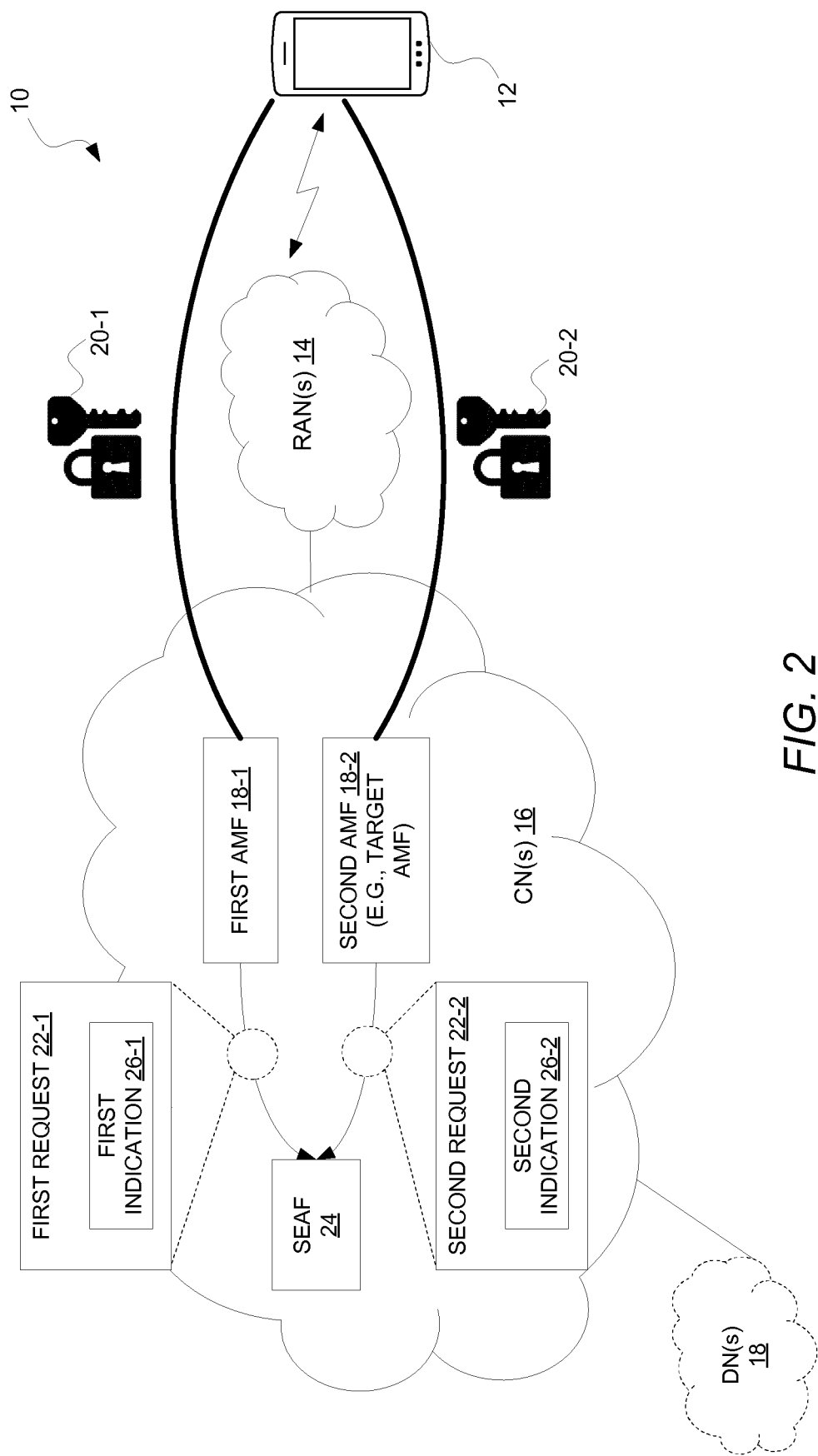
FIG. 2 is a wireless communication system illustrating to environments where embodiments presented herein can be applied.

FIG. 2 shows a wireless communication system 10 according to some embodiments. The system 10 includes one or more radio access networks (RANs) 14 that wirelessly connect user equipment 12 to one or more core networks (CNs) 16, e.g., of one or more public land mobile networks (PLMNs). The CN(s) 16 in turn connect the wireless devices 12 to one or more data networks 18, e.g., the Internet, a public switched telephone network (PSTN), etc.

The CN(s) 16 in some embodiments have a service-based architecture that leverages service-based interactions between CN network functions (NFs). Each NF may be implemented by network equipment either as a network element on dedicated hardware, as a software instance running on dedicated hardware, or as a virtualized function instantiated on an appropriate platform, e.g., on a cloud infrastructure. Where the system 10 is a 5G system, for instance, NFs in the control plane may include an access and mobility management function (AMF), a session management function (SMF), a policy control function (PCF), an authentication server function (AUSF), a security anchor function (SEAF), etc.

FIG. 2 in particular shows that the user equipment 12 requests registration with a first AMF 18-1, e.g., which may be initial registration such as occurs upon power on of the user equipment 12. As part of this registration, a key 20-1 (e.g., K_AMF) is to be determined for securing communication between the UE 12 and the first AMF 18-1. Accordingly, the first AMF 18-1 (e.g., as part of a procedure for such registration) transmits to a standalone SEAF 24 a first request 22-1 fora key 20-1 to secure communication between the UE 12 and the first AMF 18-1. The standalone SEAF 24 may be standalone in the sense that it is not collocated with an AMF. Regardless, this first request 22-1 notably includes a first indication 26-1 that indicates whether or not the UE 12 supports a standalone SEAF (also referred to as an independent SEAF). Support for a standalone SEAF may mean for instance that the UE 12 is configured according to Phase 2 of 5G standards and/or that the UE 12 is configured to handle vertical key derivation by the SEAF (as described more fully below). The SEAF 24 in turn receives the first request 22-1 with the first indication 26-1.

At some point thereafter, the UE 12 requests registration with a second AMF 18-2, e.g., for performing inter-AMF mobility to the second AMF 18-2. This second AMF 18-2 may be for instance the target AMF of an inter-AMF procedure for idle mode mobility. As part of this registration, a key 20-2 (e.g., K_AMF) is to be determined for securing communication between the UE 12 and the second AMF 18-2. Accordingly, the second AMF 18-2 (e.g., as part of a procedure for such registration) transmits to the standalone SEAF 24 a second request 22-2 for a key 20-2 to secure communication between the UE 12 and the second AMF 18-2. Notably, this second request includes a second indication 26-2 that indicates whether or not the UE 12 supports a standalone SEAF.

Having received these indications 26-1, 26-2, the standalone SEAF notably determines whether or not a bidding down attack has occurred depending (at least in part) on whether the first indication 26-1 matches the second indication 26-2, e.g., at least in the sense that they both indicate the same thing regarding the UE's support (or lack thereof) of a standalone SEAF. In some embodiments, for example, if the first and second indications 26-1, 26-2 do not match, the SEAF 24 may determine that a bidding down attack has occurred.

The SEAF 24 may directly or indirectly determine whether the first and second indications 26-1, 26-2 match in any number of ways. In some embodiments, for example, the SEAF 24 stores the first indication 26-1 for direct comparison to the second indication 26-2 once that second indication 26-2 is received. In other embodiments, by contrast, the SEAF logs the UE's support (or lack thereof) as indicated by the first indication 26-1, such as through the use of a flag or other information field, and then later checks whether the logged support/capabilities matches with the support/capabilities indicated by the second indication 26-2 once received. In still other embodiments, the SEAF 24 uses key storage as a way to effectively log support/capabilities indicated by the first indication 26-1.

In some embodiments, in response to the first request 22-1, the SEAF 24 returns the requested key. The SEAF 24 stores or discards the key returned in response to the first request 22-1, depending respectively on whether or not the first indication 26-1 indicates the UE 12 supports a standalone SEAF. If a key is stored for the UE 12, then, that indicates to the SEAF 24 later that the first indication 26-1 indicated the UE 12 supports a standalone SEAF, whereas if a key is not stored for the UE 12, then that indicates to the SEAF 24 that the first indication 26-1 indicated the UE 12 does not support a standalone SEAF. The SEAF 24 may therefore determine whether or not a bidding down attack has occurred depending on whether or not a key 20-1 is stored for the UE 12 and whether or not the second indication 26-2 indicates that the UE 12 supports a standalone SEAF. For example, the SEAF 24 may determine that a bidding down attack has occurred when a key 20-1 is stored for the UE 12 but the second indication 26-2 indicates that the UE 12 does not support a standalone SEAF. By contrast, the SEAF 24 may determine that a bidding down attack has not occurred when either: (i) a key 20-1 is not stored for the UE 12; or (ii) a key 20-1 is stored for the UE 12 and the second indication 26-2 indicates that the UE 12 supports a standalone SEAF.

Figure 3:
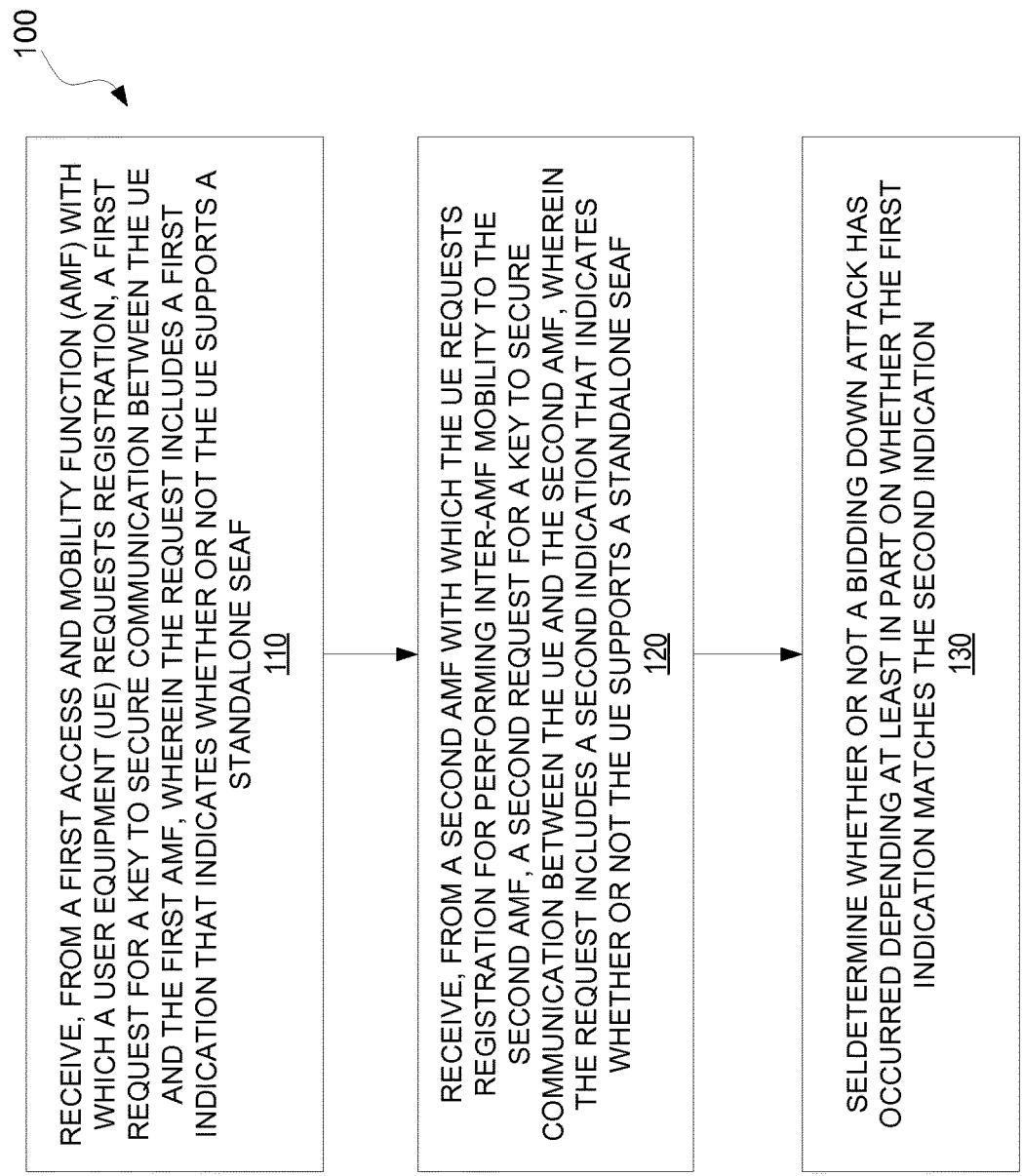
FIG. 3 is a flow chart illustrating a method for embodiments presented herein.

In view of the above modifications and variations, and the below examples, FIG. 3 illustrates a method 100 performed by network equipment configured to implement a standalone security anchor function (SEAF) 24 in a wireless communication network 10 according to some embodiments. The method 100 includes receiving, from a first access and mobility function (AMF) 18-1 with which a user equipment (UE) 12 requests registration, a first request 22-1 for a key 20-1 to secure communication between the UE 12 and the first AMF 18-1, wherein the first request 22-1 includes a first indication 26-1 that indicates whether or not the UE 12 supports a standalone SEAF (Block 110). The method 100 may also include receiving, from a second AMF 18-2 with which the UE 12 requests registration for performing inter-AMF mobility to the second AMF 18-2, a second request 22-2 for a key 20-2 to secure communication between the UE 12 and the second AMF 18-2, wherein the second request 22-2 includes a second indication 26-2 that indicates whether or not the UE 12 supports a standalone SEAF (Block 120). The method 100 may further include determining whether or not a bidding down attack has occurred depending at least in part on whether the first indication 26-1 matches the second indication 26-2 (Block 130).

In some embodiments, this determination may be explicitly performed in the sense that it is the output of a procedure for deciding whether a bidding down attack has occurred. In other embodiments, this determination may be implicitly performed in the sense that the network equipment either does or does not perform certain actions specifically designed to counter, prevent, or otherwise guard against the current bidding down attack or future bidding down attacks, depending on whether the first and second indications 26-1, 26-2 match. For example, in some embodiments, the network equipment logs or reports a mismatch, where that mismatch may be understood by the network operator to represent the occurrence of a bidding down attack, so that the network operator may track down any compromised network equipment responsible for the bidding down attack.

Figure 4:
FIG. 4 is another flow chart illustrating a method for other embodiments presented herein.

Note also that the method 100 may involve any processing for determining whether the first and second indications match. In some embodiments, the method 100 further comprises, in response to the first request, returning the requested key. The method 100 may also comprise storing or discarding the key returned in response to the first request, depending respectively on whether or not the first indication indicates the UE supports a standalone SEAF. In this case, determining whether or not a bidding down attack has occurred comprises determining whether or not a bidding down attack has occurred depending on whether or not a key is stored for the UE and whether or not the second indication indicates that the UE supports a standalone SEAF FIG. 4 illustrates a method 200 performed by network equipment configured to implement an access and mobility function (AMF) 18-1 or 18-2 in a wireless communication network 10. The method 200 includes receiving from a user equipment (UE) 12 a request for registration with the AMF 18-1 or 18-2 (Block 210). The method 200 also includes responsive to receiving the request from the UE 12, transmitting to a standalone security anchor function (SEAF) 24 a request 22-1 or 22-2 for a key 20-1 or 20-1 to secure communication between the UE 12 and the AMF, wherein the request includes an indication 26-1 or 26-2 that indicates whether or not the UE supports a standalone SEAF (Block 220).

Note that the network equipment for implementing standalone SEAF 24 as described above may perform any of the processing herein by implementing any functional means or units. In one embodiment, for example, the network equipment comprises respective circuits or circuitry configured to perform the steps shown in FIG. 3. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5:
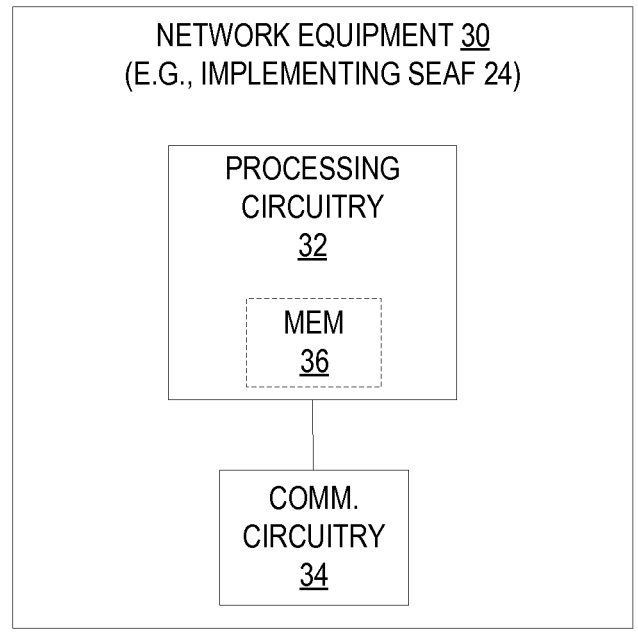
FIG. 5-8 are schematic diagrams illustrating some components/function modules of devices presented herein.

FIG. 5 illustrates network equipment 30 implementing standalone SEAF 24 in accordance with one or more embodiments. As shown, the network equipment 30 includes processing circuitry 32 and communication circuitry 34. The communication circuitry 34 is configured to transmit and/or receive information to and/or from one or more other nodes, e.g., via any communication technology. The processing circuitry 32 is configured to perform processing herein, e.g., in FIG. 3, such as by executing instructions stored in memory 36. The processing circuitry 32 in this regard may implement certain functional means, units, or modules.

Figure 6:
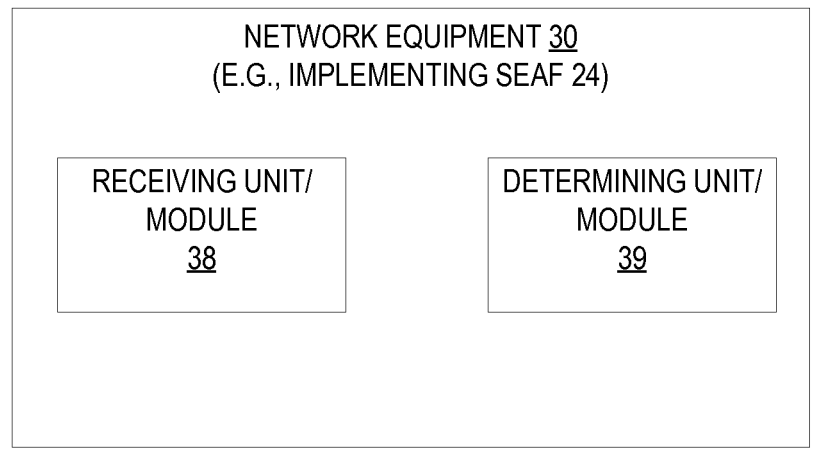

FIG. 6 illustrates network equipment 30 implementing standalone SEAF 24 in accordance with one or more other embodiments. As shown, the network equipment 30 implements various functional means, units, or modules, e.g., via the processing circuitry 32 in FIG. 5 and/or via software code. These functional means, units, or modules, e.g., for implementing the method in FIG. 3, include for instance a receiving unit or module 38 for receiving the first and/or second requests 22-1, 22-2, and a determining unit or module 39 for determining whether a bidding down attack has occurred.

Note that the network equipment implementing AMF 18-1 or 18-2 as described above may perform any of the processing herein by implementing any functional means or units. In one embodiment, for example, the network equipment comprises respective circuits or circuitry configured to perform the steps shown in FIG. 4. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7:
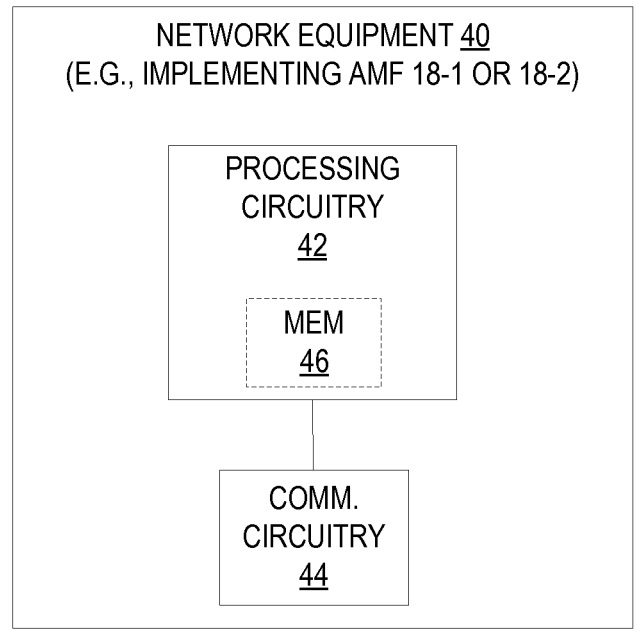

FIG. 7 illustrates network equipment 40 implementing AMF 18-1 or 18-2 in accordance with one or more embodiments. As shown, the network equipment 40 includes processing circuitry 42 and communication circuitry 44. The communication circuitry 44 is configured to transmit and/or receive information to and/or from one or more other nodes, e.g., via any communication technology. The processing circuitry 42 is configured to perform processing herein, e.g., in FIG. 4, such as by executing instructions stored in memory 46. The processing circuitry 42 in this regard may implement certain functional means, units, or modules.

Figure 8:
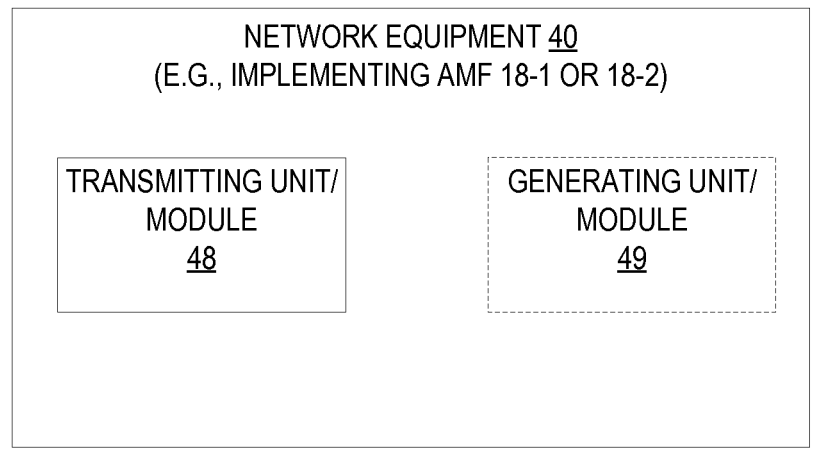

FIG. 8 illustrates network equipment 40 implementing AMF 18-1 or 18-2 in accordance with one or more other embodiments. As shown, the network equipment 40 implements various functional means, units, or modules, e.g., via the processing circuitry 42 in FIG. 7 and/or via software code. These functional means, units, or modules, e.g., for implementing the method in FIG. 4, include for instance a receiving unit or module 48 for receiving from the UE 12 a request for registration, and a transmitting unit or module 49 for transmitting to the SEAF 24 the first or second request 22-1 or 22-2.

Those skilled in the art will also appreciate that embodiments herein further include corresponding computer programs.

A computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a non-transitory computer readable (storage or recording) medium that has stored thereon instructions that, when executed by a processor of a network equipment, cause the network equipment to perform as described above.

Some specific examples will now be described at times with respect to a 5G network. These examples may illustrate and/or expound upon the embodiments described above.

One difference with 4G is the introduction of the Security Anchor Function (SEAF) intended to perform the access authentication related functionalities (AKA, Authentication and Key Agreement, primary authentication in TS 33.501) and also intended to hold the anchor key which the serving network would use to derive any further keys, thus reducing the need for costly re-authentication procedures in roaming scenarios. In 4G, such function was realized by the MME and the anchor key is the $K_{ASME}$. In 5G, authentication is under the control of the new SEAF entity and the anchor key is called $K_{SEAF}$. Upon a successful primary authentication of the UE, the SEAF and the UE establish the $K_{SEAF}$ which is then used to derive the AMF key $K_{AMF}$. The SEAF provides the $K_{AMF}$ to the serving AMF which will then activate NAS security with the UE via the NAS Security Mode Command (SMC) procedure.

The NAS SMC procedure is a roundtrip of NAS messages from the AMF down to the UE then the response up back to the AMF. It is used to select the NAS encryption and integrity protection algorithms, to establish the NAS encryption and integrity protection keys, to synchronize the NAS counters used for replay protection and to activate security for the NAS protocol. The procedure is described in TS 33.501 and is very similar to the 4G procedure specified in TS 33.401.

Now although it was agreed that the authentication and security anchor functions are to be decoupled from other connection and mobility management functions, for Phase 1 the SEAF and AMF would be still collocated. The agreement is to not rule out the introduction of an independent SEAF in Phase 2.

It may be prudent to prepare for the support of a standalone SEAF already in phase 1. This is indeed in line with the SEAF agreement for Phase 1. However, what is not clear is the bidding down problem since there is already a mechanism to protect the UE security capabilities against bidding down attacks. Any new security features requiring an additional support indication from the UE side may be included in the UE capabilities information element and protected from bidding down attacks using the NAS SMC procedure.

More precisely, the UE sends its capabilities in the Registration Request (Attach or TAU (tracking area update) message counterpart in 5G) message when it registers to the CN. The SMF sends back the received security capabilities in an integrity protected message that is the first message of the NAS SMC procedure. This is how the UE ensures that the CN has received the capabilities. One solution would be to include a new information element indicating which Phase the UE supports and use the additional information in the key derivation so that if there was a bidding down attack by a man in the middle (MiTM) then the UE and the CN will derive different keys and the NAS SMC would fail. However, this is not needed and the use of the UE security capabilities to include such an indication is sufficient as demonstrated below.

Consider now the security benefits of having a decoupled SEAF entity in the CN. In general, the security problem relates to the transfer of security keys between serving nodes. If the source and target nodes trust each other, then there is no need for special security measures besides securing the communications between the nodes. If the source node does not trust the target, then we need a mechanism for backward security. Typically, this is achieved by simply deriving a key from the source node key using a one-way function and handing over the derived key to the target node so that the target node can never recover the source node key. In case the target node does not trust the source node, then we need a mechanism for forward security. This is achieved by mechanisms that allow the target node to establish a new key not accessible to the source node, e.g. a new authentication procedure.

Forward and backward security are important aspects in the design of the RAN security. This is because base stations are typically more exposed and therefore it is assumed that they are more vulnerable than CN nodes. Hence, in order to mitigate against a potential compromise of a RAN node, it is important to have mechanisms in place that allow the source and the target node to respectively deliver and retrieve a new key during handovers. This guarantees that the target node is protected from an attack on the source node (key leakage) and vice versa.

As described in TS 33.501 and TS 33.401 before, backward security between gNBs (next generation Node B, corresponding eNB in 4G) is realized by the fact that the target node derives an intermediary key ($K_{gNB}^*$) from the current KgNB and hands over that. Forward security is realized by retrieving a new intermediary key (NH) from the AMF (MME in 4G) in the CN that is not known to the source gNB.

In 5G, a new trust model where the AMF could be compromised has been considered and led to the introduction of the higher-level entity (in the key hierarchy) called SEAF. The idea is then to mimic the AS mechanisms. Observe that for backward security, the SEAF is not needed. Backward security is realized by the target AMF performing a so called horizontal key derivation from the current $K_{AMF}$ and forwarding the resulting key to the target AMF. Now for forward security, although it can always be realized a rerun of the authentication procedure at the target AMF, the use of a key stored in the SEAF would be more efficient. The target AMF can simply request a new key from the SEAF that performs a so called vertical key derivation from the $K_{SEAF}$ and provides the resulting key to the requesting entity. Observe that the SEAF only helps to realize forward security more efficiently when the UE moves between AMFs since it removes the need for a costly authentication procedure in case the UE is roaming.

Figure 9:
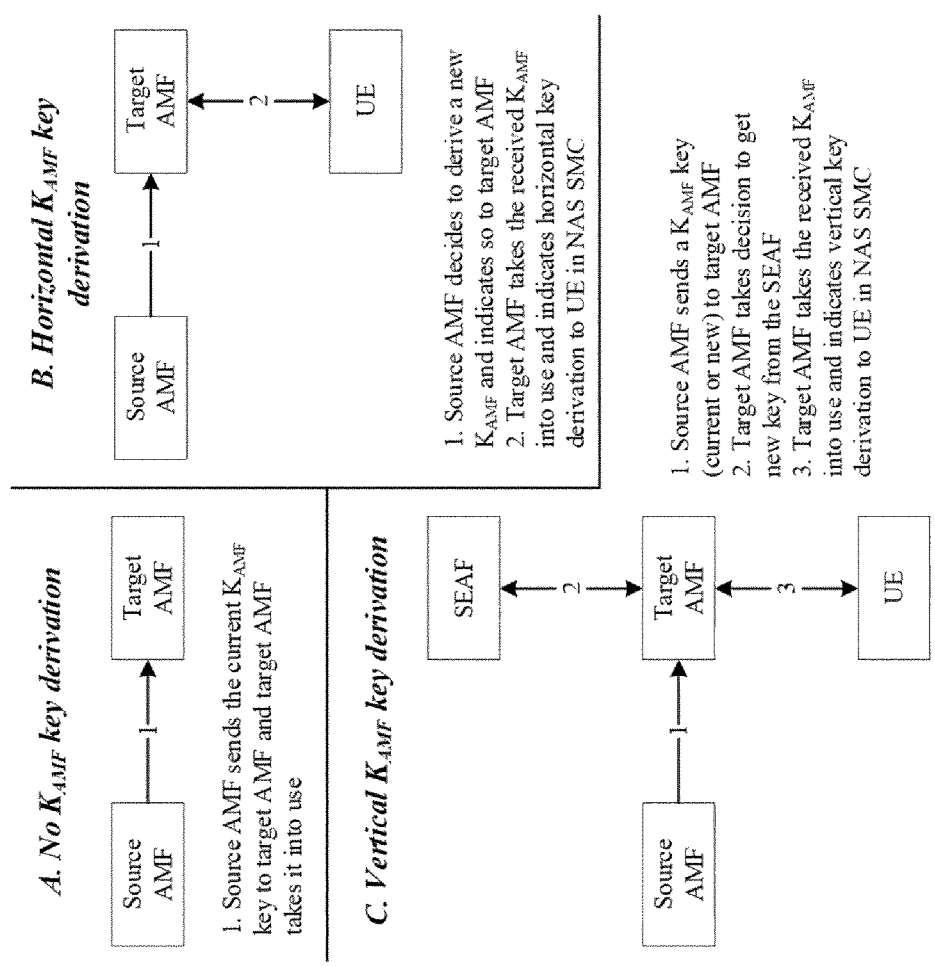
FIG. 9 is are schematic diagrams illustrating some working mechanisms for support of independent SEAF.

In Phase 2, the support of an independent SEAF is more of a serving network problem. The introduction of an independent SEAF would require changes to UE specification to support most likely a vertical key derivation indication in the NAS SMC and the key derivation steps which most likely would not be supported by Phase 1 UEs. The mechanism would work as illustrated in FIG. 9:

Source AMF takes decision based on local policy: forward current key or do horizontal key derivation.

Target AMF takes decision based on local policy: trigger a new authentication or, use received key.

Target AMF+ takes decision based on local policy: fetch a new key from SEAF or, continue using received key.

SEAF takes decision based on local policy and UE support indication: trigger a new authentication or if K_SEAF available do vertical key derivation.

Since the decision for a vertical key derivation is made at the target AMF, and the new KAMF is taken into use by a NAS SMC, there is no longer a threat of a MITM attack when the source AMF is compromised.

Figure 10:
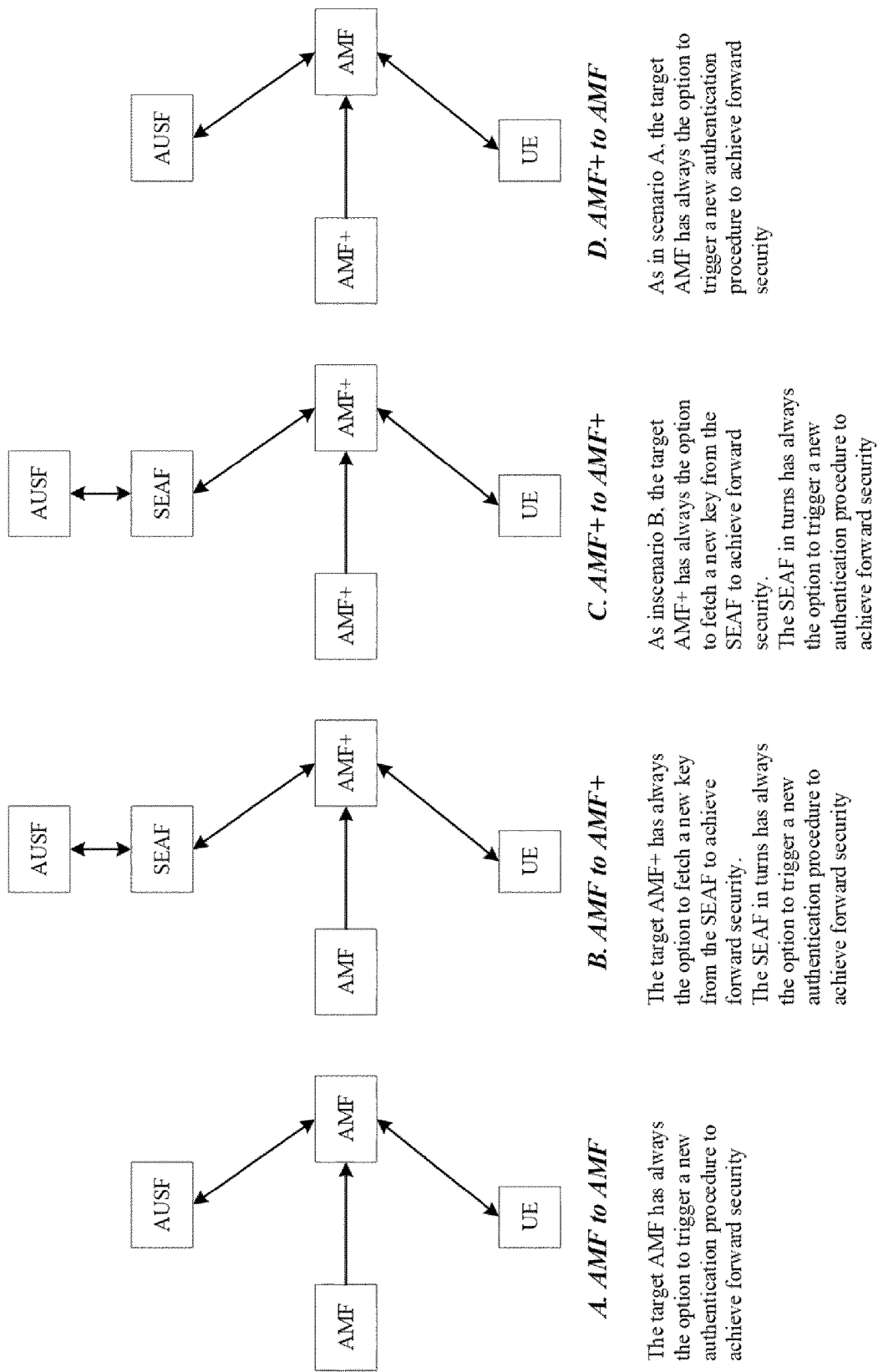
FIG. 10 are schematic diagrams illustrating different mobility scenarios in a network for embodiments presented herein.

FIG. 10 illustrates different mobility scenarios in a network where phase 1 AMFs and phase 2 AMFs denoted by AMF+ coexist within the same operator network. The main observation is that the target AMF (+) can always achieve forward security regardless of the key received from the source (same or generated by a horizontal derivation). In case target phase 1 AMFs, this is achieved by an authentication procedure. In case of target phase 2 AMFs, this is achieved by fetching a new key from the SEAF which in turn could always trigger an authentication procedure. When both types of AMFs coexist, it is possible that the independent SEAF is unable to produce a new AMF key upon a new key request from an AMF+ simply because the UE has been authenticated last through a phase 1 AMF. In such scenarios, the SEAF must trigger an authentication procedure. The decision made at the target AMF+ to fetch a new key from the SEAF does not have to depend on the UE capabilities received from the source AMF at all. Should the UE indicate that it supports independent SEAF feature, and should the UE be first served by an AMF+ then the SEAF can simply maintain a context for that UE. Otherwise the SEAF simply disposes of that context. In this case, vertical key derivation will only work for UE+ that happens to be (re-)authenticated by an AMF+. For all other cases, either SEAF is not involved or SEAF is involved but drops the context (after passing the key to a serving legacy AMF) since it would recognize a phase 1 UE.

In what follows, the symbols+ or (+) are used in entity names to indicate phase 2 or phase 1 and phase 2 supporting entities. The absence of the + or (+) indicates an only phase 1 supporting entities. For example:

UE+: Phase 2 UE

UE (+): Phase 1 or Phase 2 UE

UE: Phase 1 UE

The same applies for AMF, i.e. AMF+, AMF (+) and AMF

Some embodiments are based on the following features.

First, a new security capability is added to the UE security capabilities information element in order to indicate a UE+, i.e. a UE supporting an independent SEAF. Most likely UE+ would need to support additional functionalities in order to be able to perform a vertical key derivation and in order to process a vertical key derivation indication from the CN in the NAS protocol as described earlier (FIG. 9). Such a new capability could be a flag for example. For information, the UE security capabilities are part of the UE security context and are transferred during AMF changes as part of the UE context. Such a new capability would be transparent to AMF.

Second, the SEAF acts on such a capability by storing the anchor key ($K_{SEAF}$) resulting from a successful authentication for UE+ and disposing of it for UE. If the SEAF has already a key for a UE+ and the received capability indicates a UE then a bidding down attack has occurred.

Figure 11:
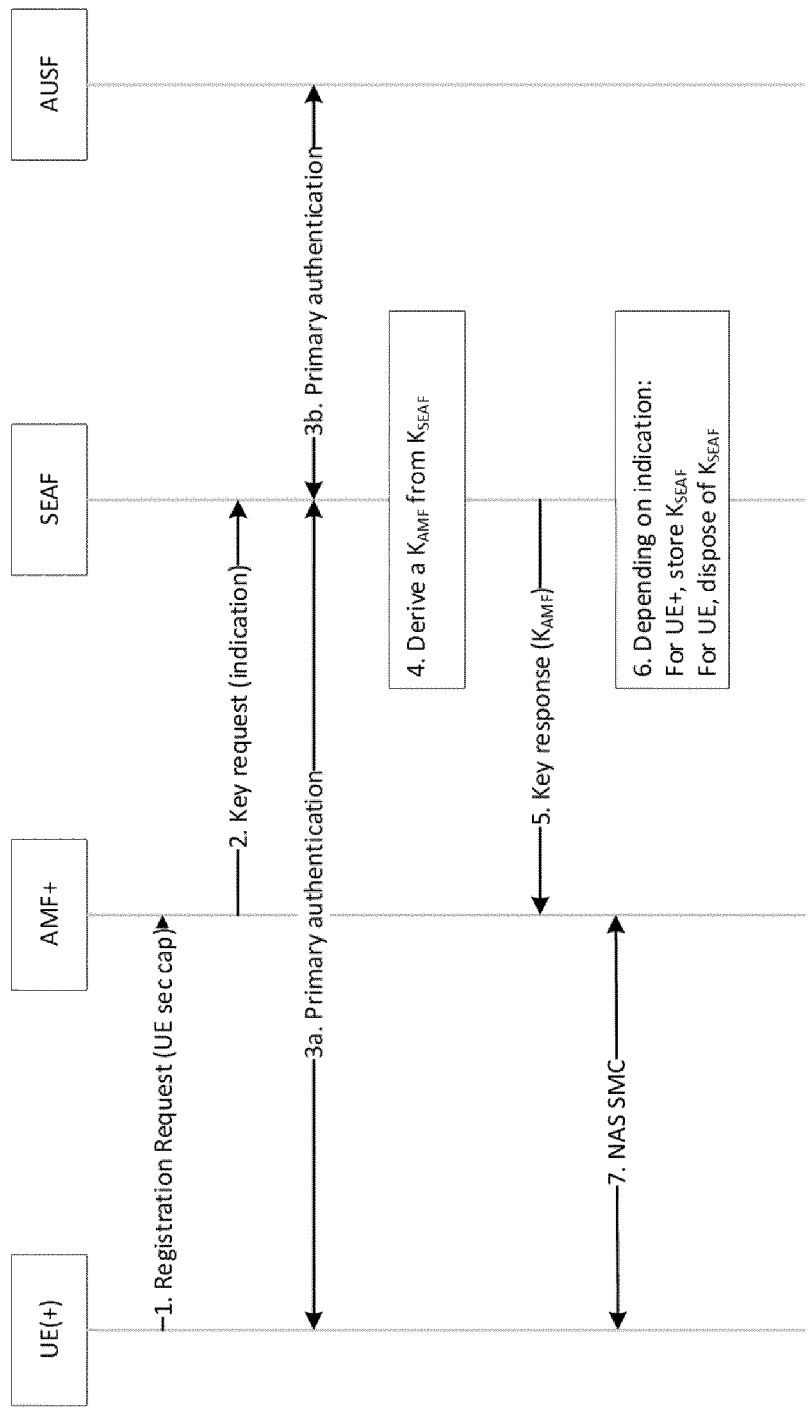
FIG. 11 is a schematic diagram illustrating a flow during initial registration.

The flow in FIG. 11 shows the interactions between a SEAF, an AMF+ and UE(+) during initial registration.

The description of the steps is provided below:
1. UE (+) initiates the registration procedure by sending a Registration Request including the UE security capabilities. For UE+, the new flag would be included indicating that the UE supports the independent SEAF features.
2. AMF+ sends a Key request message including an indication on whether the UE supports SEAF features. This indication could be a flag or AMF+ could simply forward the whole UE security capabilities IE.
3. SEAF triggers an authentication procedure involving the AUSF. A successful authentication would result in the establishment of a shared secret key the $K_{SEAF}$ between the UE and the SEAF.
4. SEAF derives a key $K_{AMF}$ from $K_{SEAF}$ to be used by the requesting AMF.
5. SEAF send the $K_{AMF}$ to AMF+.
6. Depending on indication received in step 2: For UE+, SEAF stores $K_{SEAF}$. For UE, SEAF disposes of $K_{SEAF}$.
7. AMF+ activates NAS security by an NAS SMC procedure based on the received $K_{AMF}$. Observe that step 6 can be performed anywhere between after step 4.

Figure 12:
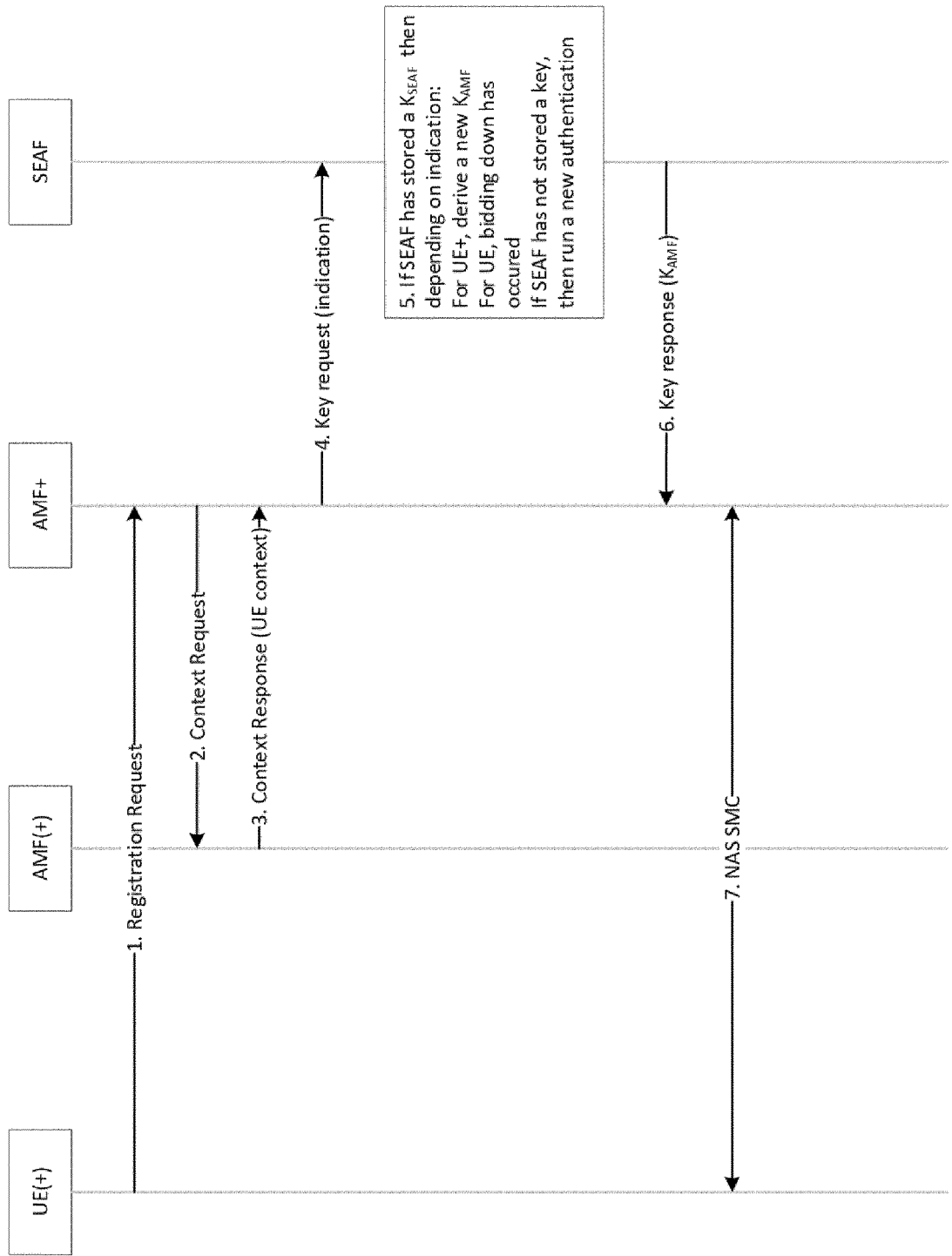
FIG. 12 is a schematic diagram illustrating a flow during idle mode mobility.

The flow in FIG. 12 shows the interaction between a SEAF, UE and AMF (+) during idle mode mobility.

The description of the steps is provided below:
1. The UE(+) initiates a Registration procedure due to mobility by sending a Registration Request message to target AMF+
2. Target AMF+ sends a Context Request to source AMF (+).
3. Source AMF (+) replies with a Context Response message including the full UE context. The UE context includes for example the UE security capabilities, the security key $K_{AMF}$, the selected NAS algorithms, etc.
4. AMF+ may decide to fetch a new key, e.g. based on a local policy, from SEAF and thus sends a key request message to SEAF potentially including an indication on whether the UE supports SEAF features. This indication could be a flag or AMF+ could simply forward the whole UE security capabilities IE.
5. If SEAF has no stored key for UE, then SEAF proceeds as in steps 3, 4 and 6 of FIG. 11. If SEAF has already a stored key for this UE, then depending on the received indication:
   a. For UE+, the SEAF may derive a new key from stored $K_{SEAF}$ or run an authentication procedure
   b. For UE, a bidding down has occurred, i.e. some entity or a MiTM has tampered with the UE security capabilities because the SEAF would not have stored a key in the first place as described in FIG. 11. The SEAF may log the event or take any other measures to handle such event.
6. SEAF send the $K_{AMF}$ to AMF+
7. AMF+ activates NAS security by an NAS SMC procedure based on the received $K_{AMF}$.

Observe that if a bidding down occurs and the SEAF somehow had disposed of the stored key, e.g. because a timer expired, then SEAF would be unable to detect that in step 5. Here is where the legacy mechanism is important because the UE will detect that anyhow during the NAS SMC procedure. This is because the UE security capabilities are sent back to the UE during that procedure in an integrity protected message based on a new fresh security key.

A user equipment as used herein is any type device capable of communicating with another radio node wirelessly over radio signals. A user equipment may therefore refer to a mobile station, a laptop, a smartphone, a machine-to-machine (M2M) device, a machine-type communications (MTC) device, a narrowband Internet of Things (IoT) device, etc. That said, although the user equipment may be referred to as a UE, it should be noted that the wireless device does not necessarily have a "user" in the sense of an individual person owning and/or operating the device. A user equipment may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, core network equipment in a core network (e.g., equipment that implements an AMF or SMF).

The following are certain enumerated embodiments further illustrating various aspects the disclosed subject matter.

1. A method performed by network equipment configured to implement a standalone security anchor function (SEAF) in a wireless communication network, the method comprising:

receiving, from a first access and mobility function (AMF) with which a user equipment (UE) requests registration, a first request for a key to secure communication between the UE and the first AMF, wherein the request includes a first indication that indicates whether or not the UE supports a standalone SEAF;

receiving, from a second AMF with which the UE requests registration for performing inter-AMF mobility to the second AMF, a second request for a key to secure communication between the UE and the second AMF, wherein the request includes a second indication that indicates whether or not the UE supports a standalone SEAF; and determining whether or not a bidding down attack has occurred depending at least in part on whether the first indication matches the second indication.

2. The method of embodiment 1, further comprising:
   in response to the first request, returning the requested key; and
   storing or discarding the key returned in response to the first request, depending respectively on whether or not the first indication indicates the UE supports a standalone SEAF;
   wherein determining whether or not a bidding down attack has occurred comprises determining whether or not a bidding down attack has occurred depending on whether or not a key is stored for the UE and whether or not the second indication indicates that the UE supports a standalone SEAF.

3. The method of embodiment 2, wherein determining whether or not a bidding down attack has occurred comprises determining that a bidding down attack has occurred when a key is stored for the UE but the second indication indicates that the UE does not support a standalone SEAF.

4. The method of any of embodiments 2-3, wherein determining whether or not a bidding down attack has occurred comprises determining that a bidding down attack has not occurred when either:
   a key is not stored for the UE; or
   a key is stored for the UE and the second indication indicates that the UE supports a standalone SEAF.

5. The method of any of embodiments 2-4, further comprising running an authentication procedure responsive to determining that a key is not stored for the UE.

6. The method of any of embodiments 2-5, further comprising, responsive to determining that a key is stored for the UE and that the second indication indicates the UE supports a standalone SEAF, obtaining a key to return in response to the second request by deriving a new key from a key stored for the UE or running an authentication procedure.

7. The method of any of embodiments 1-6, further comprising, responsive to determining that a bidding down attack has not occurred, obtaining a key to return in response to the second request and returning the obtained key.

8. The method of any of embodiments 1-7, further comprising logging whether or not the first indication indicates the UE supports a standalone SEAF and wherein determining whether or not a bidding down attack has occurred comprises comparing the first indication as logged to the second indication.

9. The method of embodiment 8, wherein said logging comprises storing the first indication or setting a flag based on the first indication.

10. The method of any of embodiment 1-9, wherein the first request and/or the second request includes a UE security capabilities information element, in whole or in part.

11. The method of any of embodiments 1-10, wherein the inter-AMF mobility is performed from a source AMF to the second AMF as a target AMF, and wherein the second indication is a representation by the source AMF of whether or not the UE supports a standalone SEAF and is transferred from the source AMF to the target AMF during a procedure for performing the inter-AMF mobility.

12. The method of any of embodiments 1-11, wherein the first AMF supports an interface to a standalone SEAF.

13. The method of any of embodiments 1-12, further comprising, responsive to determining a bidding down attack has occurred, performing one or more counter measures to counter the bidding down attack or a future bidding down attack.

14. The method of any of embodiments 1-13, further comprising, responsive to determining a bidding down attack has occurred, logging and/or reporting occurrence of the bidding down attack.

15. The method of any of embodiments 1-13, further comprising, responsive to determining a bidding down attack has occurred, performing an authentication procedure to obtain a new security anchor key with the UE.

16. Network equipment configured to implement a security anchor function (SEAF) in a wireless communication system, the network equipment configured to:
   receive, from a first access and mobility function (AMF) with which a user equipment (UE) requests registration, a first request for a key to secure communication between the UE and the first AMF, wherein the request includes a first indication that indicates whether or not the UE supports a standalone SEAF;
   receive, from a second AMF with which the UE requests registration for performing inter-AMF mobility to the second AMF, a second request for a key to secure communication between the UE and the second AMF, wherein the request includes a second indication that indicates whether or not the UE supports a standalone SEAF; and
   determine whether or not a bidding down attack has occurred depending at least in part on whether the first indication matches the second indication.

17. The network equipment of embodiment 16, configured to perform the method of any of embodiments 2-15.

18. A computer program comprising instructions which, when executed by at least one processor of network equipment, causes the network equipment to perform the method of any of embodiments 1-15.

19. A carrier containing the computer program of embodiment 18, wherein the carrier is one of an electronic signal, optical signal, radio signal, or computer readable storage medium.

20. Network equipment configured to implement a security anchor function (SEAF) in a wireless communication system, the network equipment comprising:
   processing circuitry and memory, the memory containing instructions executable by the processing circuitry wherein the network equipment is configured to:
   receive, from a first access and mobility function (AMF) with which a user equipment (UE) requests registration, a first request for a key to secure communication between the UE and the first AMF, wherein the request includes a first indication that indicates whether or not the UE supports a standalone SEAF;
   receive, from a second AMF with which the UE requests registration for performing inter-AMF mobility to the second AMF, a second request for a key to secure communication between the UE and the second AMF, wherein the request includes a second indication that indicates whether or not the UE supports a standalone SEAF; and
   determine whether or not a bidding down attack has occurred depending at least in part on whether the first indication matches the second indication.

21. The network equipment of embodiment 20, the memory containing instructions executable by the processing circuitry wherein the network equipment is configured to perform the method of any of embodiments 2-15.

22. Network equipment configured to implement a security anchor function (SEAF) in a wireless communication system, the network equipment comprising:

a receiving module for receiving, from a first access and mobility function (AMF) with which a user equipment (UE) requests registration, a first request for a key to secure communication between the UE and the first AMF, wherein the request includes a first indication that indicates whether or not the UE supports a standalone SEAF;

wherein the receiving module is further for receiving, from a second AMF with which the UE requests registration for performing inter-AMF mobility to the second AMF, a second request for a key to secure communication between the UE and the second AMF, wherein the request includes a second indication that indicates whether or not the UE supports a standalone SEAF; and a determining module for determining whether or not a bidding down attack has occurred depending at least in part on whether the first indication matches the second indication.

23. The network equipment of embodiment 22, comprising one or more modules for performing the method of any of embodiments 2-15.

24. A method performed by network equipment configured to implement an access and mobility function (AMF) in a wireless communication network, the method comprising:

receiving from a user equipment (UE) a request for registration with the AMF; and responsive to receiving the request from the UE, transmitting to a standalone security anchor function (SEAF) a request for a key to secure communication between the UE and the AMF, wherein the request includes an indication that indicates whether or not the UE supports a standalone SEAF.

25. The method of embodiment 24, wherein the AMF is an AMF with which the UE requests registration for performing inter-AMF mobility from a source AMF to the AMF as a target AMF.

26. The method of embodiment 25, further comprising receiving the indication from the source AMF and wherein the indication is a representation by the source AMF of whether or not the UE supports a standalone SEAF.

27. The method of embodiment 24, wherein the AMF is an AMF with which the UE requests initial registration.

28. The method of any of embodiments 24-27, wherein the request includes a UE security capabilities information element, in whole or in part.

29. The method of any of embodiments 24-28, wherein the AMF supports an interface to a standalone SEAF.

30. The method of any of embodiments 24-29, further comprising receiving the requested key in response to transmitting the request.

31. Network equipment configured to implement an access and mobility function (AMF) in a wireless communication network, the network equipment configured to:

receive from a user equipment (UE) a request for registration with the AMF; and responsive to receiving the request from the UE, transmit to a standalone security anchor function (SEAF) a request for a key to secure communication between the UE and the AMF, wherein the request includes an indication that indicates whether or not the UE supports a standalone SEAF.

32. The network equipment of embodiment 31, configured to perform the method of any of embodiments 25-30.

33. A computer program comprising instructions which, when executed by at least one processor of network equipment, causes the network equipment to perform the method of any of embodiments 24-30.

34. A carrier containing the computer program of embodiment 33, wherein the carrier is one of an electronic signal, optical signal, radio signal, or computer readable storage medium.

35. Network equipment configured to implement an access and mobility function (AMF) in a wireless communication system, the network equipment comprising:

processing circuitry and memory, the memory containing instructions executable by the processing circuitry wherein the network equipment is configured to:

receive from a user equipment (UE) a request for registration with the AMF; and responsive to receiving the request from the UE, transmit to a standalone security anchor function (SEAF) a request for a key to secure communication between the UE and the AMF, wherein the request includes an indication that indicates whether or not the UE supports a standalone SEAF.

36. The network equipment of embodiment 35, the memory containing instructions executable by the processing circuitry wherein the network equipment is configured to perform the method of any of embodiments 25-30.

37. Network equipment configured to implement an access and mobility function (AMF) in a wireless communication system, the network equipment comprising:

a receiving module for receiving from a user equipment (UE) a request for registration with the AMF; and a transmitting module for, responsive to receiving the request from the UE, transmitting to a standalone security anchor function (SEAF) a request for a key to secure communication between the UE and the AMF, wherein the request includes an indication that indicates whether or not the UE supports a standalone SEAF.

Note further that embodiments herein may use any of one or more communication protocols known in the art or that may be developed, such as IEEE 802.xx, Code Division Multiple Access (CDMA), Wideband CDMA (WCDMA), Global System for Mobile telecommunications (GSM), Long Term Evolution (LTE), WiMax, New Radio (NR), or the like. Accordingly, although sometimes described herein in the context of 5G, the principles and concepts discussed herein are applicable to 4G systems and others.

The invention claimed is:

1. A method performed by network equipment configured to implement a standalone security anchor function (SEAF) in a wireless communication network, the method comprising:

receiving, by the network equipment, from a first access and mobility function (AMF) with which a user equipment (UE) requests registration, a first request for a key to secure communication between the UE and the first AMF, wherein the request includes a first indication that indicates whether or not the UE supports a standalone SEAF;

in response to the first request, returning the requested key;

storing or discarding, by the network equipment, the key returned in response to the first request, depending respectively on whether or not the first indication indicates the UE supports a standalone SEAF;

receiving, by the network equipment, from a second AMF with which the UE requests registration for performing inter-AMF mobility to the second AMF, a second request for a key to secure communication between the UE and the second AMF, wherein the request includes a second indication that indicates whether or not the UE supports a standalone SEAF; and determining by the network equipment, whether or not a bidding down attack has occurred depending on whether or not a key is stored for the UE and whether or not the second indication indicates that the UE supports a standalone SEAF; and responsive to determining that a bidding down attack has occurred, performing one or more counter measures to counter the bidding down attack or a future bidding down attack.

2. The method of claim 1, wherein the determining whether or not a bidding down attack has occurred comprises determining that a bidding down attack has occurred when a key is stored for the UE but the second indication indicates that the UE does not support a standalone SEAF.

3. The method of claim 1, wherein the determining whether or not a bidding down attack has occurred comprises determining that a bidding down attack has not occurred when either:
a key is not stored for the UE; or
a key is stored for the UE and the second indication indicates that the UE supports a standalone SEAF.

4. The method of claim 1, wherein, performing one or more counter measures comprises running an authentication procedure responsive to determining that a key is not stored for the UE.

5. The method of claim 1, further comprising, responsive to determining that a key is stored for the UE and that the second indication indicates the UE supports a standalone SEAF, obtaining a key to return in response to the second request by deriving a new key from a key stored for the UE or running an authentication procedure.

6. The method of claim 1, further comprising, responsive to determining that a bidding down attack has not occurred, obtaining by the network equipment, a key to return in response to the second request and returning the obtained key.

7. The method of claim 1:
further comprising logging by the network equipment, whether or not the first indication indicates the UE supports a standalone SEAF; and
wherein determining whether or not a bidding down attack has occurred comprises comparing the first indication as logged to the second indication.

8. The method of claim 7, wherein said logging by the network equipment, comprises storing the first indication or setting a flag based on the first indication.

9. The method of claim 1, wherein the first request and/or the second request includes a UE security capabilities information element, in whole or in part.

10. The method of claim 1:
wherein the inter-AMF mobility is performed from a source AMF to the second AMF as a target AMF; and
wherein the second indication is a representation by the source AMF of whether or not the UE supports a standalone SEAF and is transferred from the source AMF to the target AMF during a procedure for performing the inter-AMF mobility.

11. The method of claim 1, wherein the first AMF supports an interface to a standalone SEAF.

12. The method of claim 1, further comprising, responsive to determining a bidding down attack has occurred, logging and/or reporting by the network equipment, occurrence of the bidding down attack.

13. The method of claim 1, wherein, performing one or more counter measures comprises performing an authentication procedure to obtain a new security anchor key with the UE.

14. A network equipment configured to implement an access and mobility function (AMF) in a wireless communication system, the network equipment comprising:
processing circuitry;
memory containing instructions executable by the processing circuitry whereby the network equipment is operative to:
receive, from a first access and mobility function (AMF) with which a user equipment (UE) requests registration, a first request for a key to secure communication between the UE and the first AMF, wherein the request includes a first indication that indicates whether or not the UE supports a standalone SEAF;
in response to the first request, return the requested key;
store or discard the key returned in response to the first request, depending respectively on whether or not the first indication indicates the UE supports a standalone SEAF;
receive, from a second AMF with which the UE requests registration for performing inter-AMF mobility to the second AMF, a second request for a key to secure communication between the UE and the second AMF, wherein the request includes a second indication that indicates whether or not the UE supports a standalone SEAF; and
determine whether or not a bidding down attack has occurred depending at least in part on whether the first indication matches the second indication on whether or not a key is stored for the UE and whether or not the second indication indicates that the UE supports a standalone SEAF; and
responsive to determining that a bidding down attack has occurred, perform one or more counter measures to counter the bidding down attack or a future bidding down attack.

* * * * *